Figure 1:
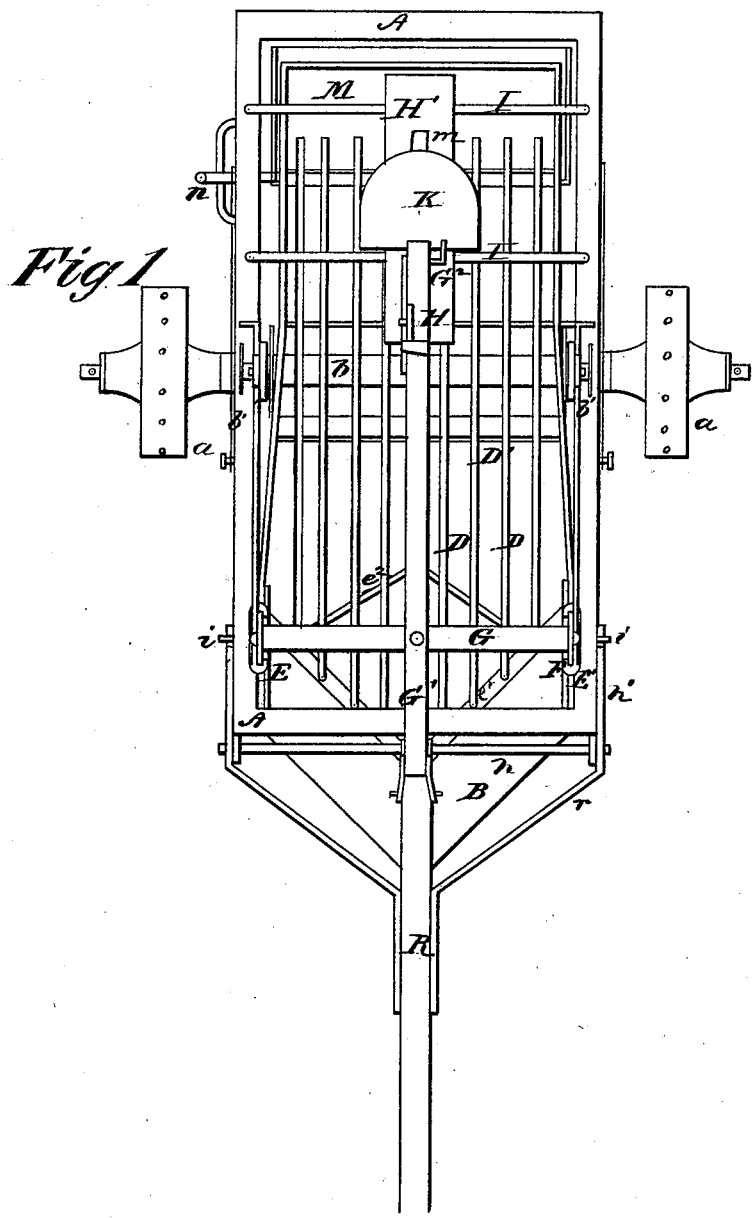

2 Sheets—Sheet 1.

I. HOBSON & O. J. BEYMER.
POTATO-DIGGER.

No. 177,333.  Patented May 16, 1876.

Witnesses
Jos. P. Connolly
M. Connolly

Inventor
Iris Hobson
Osborn J. Beymer
By Connolly Bros Attorneys

2 Sheets—Sheet 2.
I. HOBSON & O. J. BEYMER.
POTATO-DIGGER.
No. 177,333.  Patented May 16, 1876.
*Fig. 2*
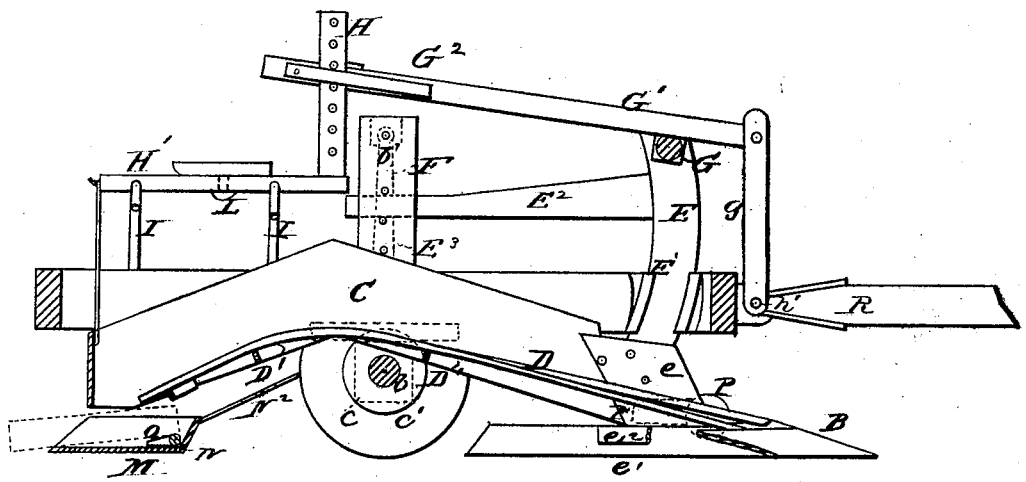
*Fig. 3*
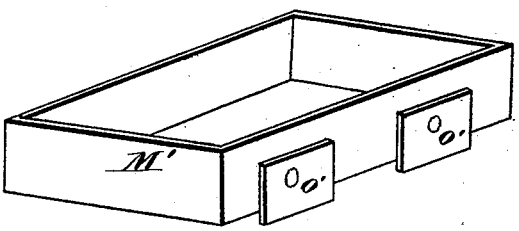
*Fig. 4*
Witnesses
J. P. Connolly
M. Connolly
Inventor
Iris Hobson
Osborn J. Beymer
By Connolly Bros
Attorneys

UNITED STATES PATENT OFFICE.

IRIS HOBSON AND OSBORN J. BEYMER, OF FORT SCOTT, KANSAS.

IMPROVEMENT IN POTATO-DIGGERS.

Specification forming part of Letters Patent No. 177,333, dated May 16, 1876; application filed September 18, 1875.

*To all whom it may concern:*

Be it known that we, IRIS HOBSON and OSBORN J. BEYMER, of Fort Scott, in the county of Bourbon and State of Kansas, have invented certain new and useful Improvements in Potato-Diggers; and we do hereby declare the following to be a full, clear, and exact description of the invention, such as will enable others skilled in the art to which it pertains to make and use it, reference being had to the accompanying drawings, which form part of this specification, in which—

Figure 1 is a plan view of our invention. Fig. 2 is a vertical longitudinal section; and Fig. 3 is a perspective view of receiving-box. Fig. 4 is a detail view.

Our invention has relation to potato-diggers; and consists in the novel construction, combination, and arrangements of parts in an implement having means for digging, screening, and gathering the potatoes, cutting the obstructing vines, adjusting the plow and screen, and elevating and lowering the frame, all as hereinafter more particularly described and specifically claimed.

Referring to the accompanying drawings, A designates a rectangular oblong frame, mounted upon two wheels, $a$ $a$, which are attached to a suitable axle, $b$, journaled in the lower ends of two vertical standards, $b'$ $b'$, attached to the inner surface of the main frame A, which may be adjustable for the purpose of allowing said frame to be conveniently raised and lowered. One of the wheels $a$ is loose upon its spindle, while the other is secured to and gives motion to the axle, which is provided with eccentrics or cams $c$, for agitating the screen, as hereinafter set forth. B designates the share, situated in the forward part of the implement, and having converging inclined faces or sides, terminating at their rearmost parts in vertical upward extensions $e$, having a slight pitch or inclination backward, and having their front edges sharpened. The share is attached to a central blade, $e^1$, which is strengthened by diagonal braces $e^2$. C designates the sides or frame of the elevator and screen, attached to the upright portions $e$ of the share, at the back edges thereof, and thence extending upward and rearward in the direction of a curve, having inclines on opposite sides of the axle. D are the screen and elevator rods, secured to the back part of the share, and thence proceeding backward in a direction corresponding to that of the frame C. These are supported by transverse bars D', &c., connecting the sides of the frame C, as shown. The sides of frame C rest upon the cams $c$, and between the disks $c'$, which are attached to the sides of said cams, to hold the frame in place. E represents segmental or curved standards, secured to the sides of the share, and passing upward between the flanges of suitable guides $E^1$, attached to the frame A by pivots, upon which said guides may turn, to allow the pitch of the share to be varied. $E^2$ are lever-arms attached to the standards E, and engaging, near their rear ends, with racks F formed on the standards $b'$, being held by suitable spring-plates $E^3$, attached to standards $b'$. G is a rock-shaft journaled to the standards E. $G^1$ is a lever attached to said rock-shaft, and having suitable connection $g$ at the end of its short arm, with the tongue-rod $h$. At its rear end the lever $G^1$ has a catch, $G^2$, by means of which it engages with a rack, H, rising from the front of the driver's platform H'. The platform H' is supported upon rods I, and holds an adjustable seat, K, having a screw, L, passing through a longitudinal slot, $m$, in said platform and allowing the seat to be secured at any suitable place. M designates a receiver, having flanged sides and front, the latter being inclined so as to pass easily over the surface of the ground. N is a rod passing transversely through said receiver at its forward part, and close to its bottom. This rod is operated upon its axis by means of a lever, $n$, and is provided with a spur, $o$, for a purpose hereinafter stated. $N^2$ are oblique or inclined rods attached to the frame A, and supporting the receiver N. $M^1$ is a box adapted to lie in the receiver, and provided with cleats or flanges O', which pass down in front of the rod N, and on each side of the spur. P are small sharp-edged rotary cutters or colters, supported by arms $p$, forward of and in contact with the edges of the share sides S, so as to form rolling shears. R represents the tongue, having the side braces $r$ extended back from their points of attachment to the rod $h$, and formed, each extension $h'$, with a notch to receive a pin, $i$, projecting from the corresponding side of the frame.

The operation is as follows: The implement is drawn by horses, and when in motion, the potatoes are dug by the share, which upturns the soil. The potatoes are then caused to pass upward over the screen, and are by its agitation relieved of the adhering earth, after which they fall into the box at the rear end of the implement. As soon as the box is filled, it is tilted by turning the rod N, so that the spur $o$ will raise the flanges $o'$ from the rod. This allows the box to be removed, the receiver M sliding from underneath it, to make room for another.

The pitch or inclination of the share is regulated by the levers $E^2$ acting upon the curved standards E. The height is regulated by means of the lever $G^1$. As the implement is drawn along vines are cut by means of the rolling cutters P.

Having fully described our invention, we claim as new and desire to secure by Letters Patent—

1. In combination with the share B, adjustable to regulate independently its pitch or inclination, the fulcrumed standards E, and levers $E^2$, substantially as described and shown.

2. The share B, adjustable to regulate its pitch or inclination and vertical height, respectively, substantially as described and shown.

3. In combination with the share B, adjustable vertically, and to regulate its pitch, the sliding standards E and pivoted guide-plates $E^1$, substantially as described.

4. The receiver M, rod N, spur $o$, and lever $n$, combined and arranged substantially as and for the purpose specified.

5. The box M', having the flanges $o'$ $o'$, in combination with the receiver M, having the rod N, with spur O, as and for the purpose described.

In testimony that we claim the foregoing we have hereunto set our hands this 4th day of August, 1875.

IRIS HOBSON.
    OSBORN J. BEYMER.

Witnesses:
 W. M. GREGORY,
 JOEL B. MAPES.